(12) United States Patent
Witschnig et al.

(10) Patent No.: US 9,860,009 B2
(45) Date of Patent: *Jan. 2, 2018

(54) SYSTEM HAVING PLASTIC WAVEGUIDES

(71) Applicant: Infineon Technologies AG, Neubiberg (DE)

(72) Inventors: Harald Witschnig, Landskron (AT); Dirk Hammerschmidt, Villach (AT); David Levy, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,444

(22) Filed: Mar. 30, 2017

(65) Prior Publication Data

US 2017/0207874 A1 Jul. 20, 2017

Related U.S. Application Data

(63) Continuation of application No. 14/272,619, filed on May 8, 2014, now Pat. No. 9,648,399.

(51) Int. Cl.
*H04J 14/02* (2006.01)
*H04Q 11/00* (2006.01)

(52) U.S. Cl.
CPC .......... *H04J 14/02* (2013.01); *H04Q 11/0066* (2013.01); *H04Q 2011/0045* (2013.01); *H04Q 2011/0086* (2013.01)

(58) Field of Classification Search
CPC ................ H04Q 9/00; H04Q 11/0066; H04Q 2011/0086; H04Q 2011/0045; H04Q 2209/40; B60R 16/0207; H04J 14/02
See application file for complete search history.

(56) References Cited

U.S. PATENT DOCUMENTS

| | | |
|---|---|---|
| 4,731,880 A | 3/1988 | Ault et al. |
| 5,802,056 A | 9/1998 | Ferguson et al. |
| 6,389,029 B1 | 5/2002 | McAlear |
| 6,611,635 B1 | 8/2003 | Yoshimura |
| 7,239,288 B2 | 7/2007 | Lynch et al. |

(Continued)

OTHER PUBLICATIONS

Non-Final Office Action dated Sep. 27, 2016 for U.S. Appl. No. 14/260,339.

(Continued)

*Primary Examiner* — Ted Wang
(74) *Attorney, Agent, or Firm* — Eschweiler & Potashnik, LLC

(57) ABSTRACT

The present disclosure relates to a system having a plurality of electronic devices interconnected by way of dielectric waveguides. In some embodiments, the system has a plurality of electronic devices respectively including a data element and a transceiver element. The data element has a plurality of terminals configured to respectively output and receive data. The transceiver is configured to transmit or receive the data as a wireless signal that distinctly identifies data from different ones of the plurality of terminals. A shared resource component has a shared transceiver configured to generate a shared wireless signal that transmits a shared signal to the plurality of electronic devices by way of a plurality of dielectric waveguides. Respective ones of the plurality of dielectric waveguides are disposed between the shared resource component and one of the plurality of electronic devices.

22 Claims, 4 Drawing Sheets

(56) References Cited

U.S. PATENT DOCUMENTS

| | | |
|---|---|---|
| 2004/0063430 A1 | 4/2004 | Cave et al. |
| 2005/0031347 A1 | 2/2005 | Soto et al. |
| 2005/0239456 A1 | 10/2005 | Sung et al. |
| 2013/0134730 A1 | 5/2013 | Ricci |
| 2013/0308581 A1 | 11/2013 | Rofougaran |
| 2015/0207680 A1 | 7/2015 | Ivanov et al. |
| 2015/0263403 A1 | 9/2015 | Spella et al. |

OTHER PUBLICATIONS

Final Office Action dated Apr. 13, 2016 for U.S. Appl. No. 14/260,339.
Non-Final Office Action dated Oct. 15, 2015 for U.S. Appl. No. 14/260,339.
Notice of Allowance dated Jan. 5, 2017 for U.S. Appl. No. 14/272,619.
Non-Final Office Action dated Aug. 5, 2016 for U.S. Appl. No. 14/272,619.

SYSTEM HAVING PLASTIC WAVEGUIDES

REFERENCE TO RELATED APPLICATION

This application is a continuation of U.S. application Ser. No. 14/272,619 filed on May 8, 2014, the contents of which are incorporated by reference in their entirety.

BACKGROUND

Modern day electronic systems (e.g., mobile phones, automobiles, etc.) often provide for a wide range of functionalities. Such functionalities can be achieved by integrating together a large number of separate electronic devices, which are respectively configured to perform specific functions. During operation, the separate electronic devices communicate with each other by transferring data. For example, modern day automobiles may comprise many different sensors (e.g., a digital camera able to capture digital images, a pressure sensor able to detect a tire pressure, etc.) that are connected to a processor that is able to process sensor data and to provide the processed sensor data to a display configured to display an image to a user.

DETAILED DESCRIPTION

Figure 1:
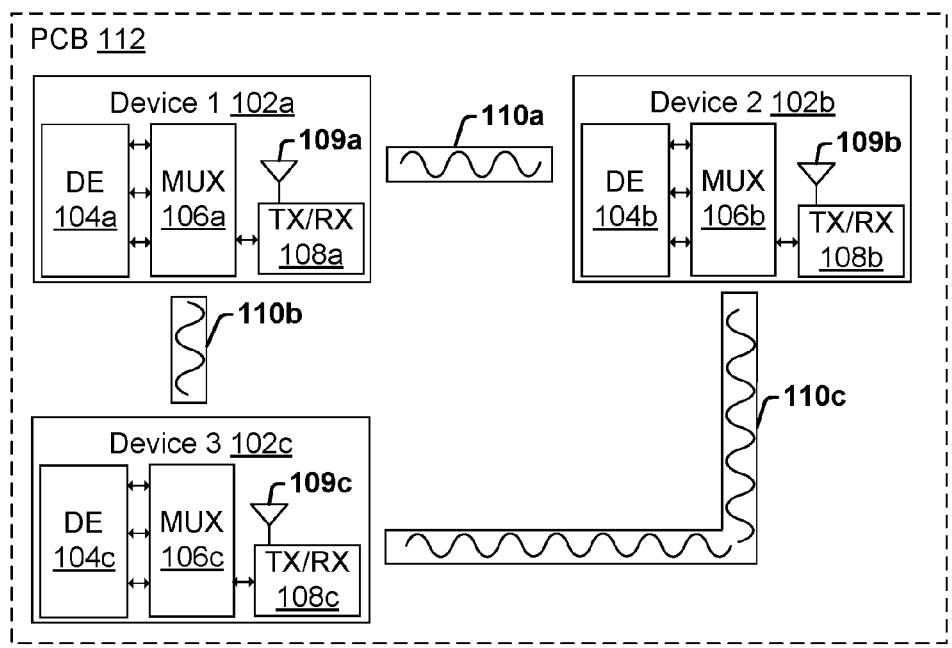
FIG. 1 is a block diagram of some embodiments of a system having a plurality of electronic devices interconnected by dielectric waveguides.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Metal interconnect wires (e.g., copper wires) are often used to provide data connections between different electronic devices. In systems having a multiple electronic devices, metal interconnect wires may extend between each pair of electronic devices (i.e., in a system where n electronic devices communicate with each other, this results in n/2*n−1 metal interconnect wire paths). In complex systems, the number of metal interconnect wires may become very large, resulting in negative consequences including a large weight (e.g., in automotive applications), a large expense, and a complex layout that has a high risk of failure and high risk of cross-talk between metal wire interconnects.

Metal wire interconnects also provide for a limited data transfer bandwidth. Therefore, as data rates continue to grow, a larger number of metal wire interconnects (e.g., 30 or 40 metal wire interconnects) may be used to provide for sufficient data transfer bandwidth (e.g., of one dedicated information) between each pair of electronic devices. To alleviate such bandwidth problems, short range wireless communication has been proposed as an alternative solution to transfer data between electronic devices. Short wave wireless communication transfers data using wireless signals (e.g., RF signals) that provide for a larger bandwidth than conventional metal wire interconnects. However, short range wireless communication is susceptible to disturbances/noise (e.g., due to ignition, etc.) that make wireless data transmission through free space an unviable option to meet transmission standards in certain application (e.g., in safety functional applications, such as automobiles).

Accordingly, the present disclosure relates to a system having a plurality of electronic devices interconnected by way of dielectric waveguides. In some embodiments, the system comprises a plurality of electronic devices respectively comprising a data element and a multiplexing element. The data element has a plurality of electronic device terminals configured to output and receive data. The multiplexing element is configured to provide the data output from the plurality of electronic device terminals to a transceiver element, which is configured to generate a wireless signal that transmits the data in a manner that distinctly identifies data from different electronic device terminals. A plurality of dielectric waveguides comprising a dielectric material are disposed at locations between the plurality of electronic devices. The plurality of dielectric waveguides are configured to convey the wireless signal between the plurality of electronic devices. By interconnecting electronic devices using dielectric waveguides, disadvantages associated with metal wire interconnects can be mitigated.

FIG. 1 is a block diagram of some embodiments of a system 100 having a plurality of electronic devices 102a-102c interconnected by way of a plurality of dielectric waveguides 110a-110c.

The system 100 comprises a plurality of electronic devices 102a-102c. In some embodiments, the plurality of electronic devices 102a-102c may comprise one or more dedicated devices configured to perform a task (e.g., a digital camera, a sensor, etc.) and/or an integrated chip. In some embodiments, the system 100 may comprise a printed circuit board (PCB) 112 (e.g., a mother board) upon which the plurality of electronic devices 102a-102c are affixed. In other embodiments, the system 100 may comprise an integrated chip package or an automotive system.

A plurality of dielectric waveguides 110a-110c extend between the plurality of electronic devices 102a-102c. In some embodiments, respective ones of the plurality of dielectric waveguides 110a-110c are disposed between two of the plurality of electronic devices 102a-102c. For example, a first dielectric waveguide 110a is disposed at a first location extending between a first electronic device 102a and a second electronic device 102b, a second dielectric waveguide 110b is disposed at a second location extending between the first electronic device 102a and a third electronic device 102c, etc. In various embodiments, the dimensions (e.g., length and/or width) of the plurality of dielectric waveguides 110a-110c may vary depending upon a frequency of a transmitted wireless signal.

The plurality of electronic devices 102a-102c respectively comprise a data element 104, a multiplexing element 106, and a transceiver element 108. The data element 104 comprises a plurality of electronic device terminals (e.g., input/output pins) configured to output and/or receive data (e.g., data corresponding to an image captured by an electronic device comprising a digital camera, data corresponding to a tire pressure measurement captured by an electronic device comprising a tire pressure sensor, etc.). In some embodiments, each of the plurality of electronic device terminals may be configured to provide for a different output as a separate data channel. For example, in some embodiments, an electronic device 102 may comprise a sensor having a first electronic device terminal configured to output a temperature detected by the sensor, a second electronic device terminal configured to output an angle detected by the sensor, a third electronic device terminal configured to output a status of the sensor, etc.

The multiplexing element 106 is configured to multiplex the data from the plurality of electronic device terminals to the transceiver element 108 in a manner that distinctly identifies data from different electronic device terminals. In other words, the multiplexing element 106 multiplexes data output from the plurality of electronic devices terminals in a manner that allows for the data from each of the electronic device terminals to be reconstructed upon receipt. The transceiver element 108 is configured to modulate the multiplexed data onto a carrier wave that is provided as a wireless signal that transmits the data (via antenna 107) to the plurality of electronic devices 102a-102c. In various embodiments, the transceiver element 108 may modulate the data from the plurality of electronic device terminals onto the carrier wave by way of frequency modulation, phase modulation, and/or amplitude modulation before or after multiplexing.

The multiplexing element 106 is further configured to de-multiplex data on a carrier wave received from a dielectric waveguide (i.e., to break up a received wireless signal to retrieve data from each of the electronic device terminals) to the plurality of electronic device terminals of a receiving electronic device. In various embodiments, the multiplexing elements 106a-106c may multiplex the data output from and/or de-multiplex the data received at the electronic device terminals in frequency, time, code, or a combination thereof.

The plurality of dielectric waveguides 110a-110c are configured to convey the wireless signals comprising the multiplexed data between the plurality of electronic devices 102a-102c. The plurality of dielectric waveguides 110a-110c reduce attenuation of the wireless signals travelling between the plurality of electronic devices 102a-102c by confining the wireless signals by total internal reflection (i.e., a change in refractive index due to the change in dielectric constant at a surface of a dielectric waveguide causes electromagnetic waves carrying the wireless signal to be repeatedly reflected between opposite walls of a dielectric waveguide as the wireless signal travels through the waveguide). By reducing attenuation of the wireless signals, the plurality of dielectric waveguides 110a-110c are able to convey transmitted data to another one of the plurality of electronic devices 102a-102c. For example, a first electronic device 102a may convey data to a second electronic device 102b by way of dielectric waveguide 110b. The dielectric waveguides 110a-110c also provide for a relatively low cross-talk (i.e., noise) in comparison to metal interconnect wires.

The plurality of dielectric waveguides 110a-110c provide for a large bandwidth (e.g., greater than 100 GHz), such that in some embodiments a single dielectric waveguide may convey signals that were previously conveyed by a plurality of metal interconnect lines (i.e., the large bandwidth of the dielectric waveguide allows for the dielectric waveguide to replace multiple metal interconnect lines between electronic devices). In some embodiments, the plurality of dielectric waveguides 110a-110c may comprise solid rods or cables of dielectric material extending between the plurality of electronic devices 102a-102c.

Figure 2:
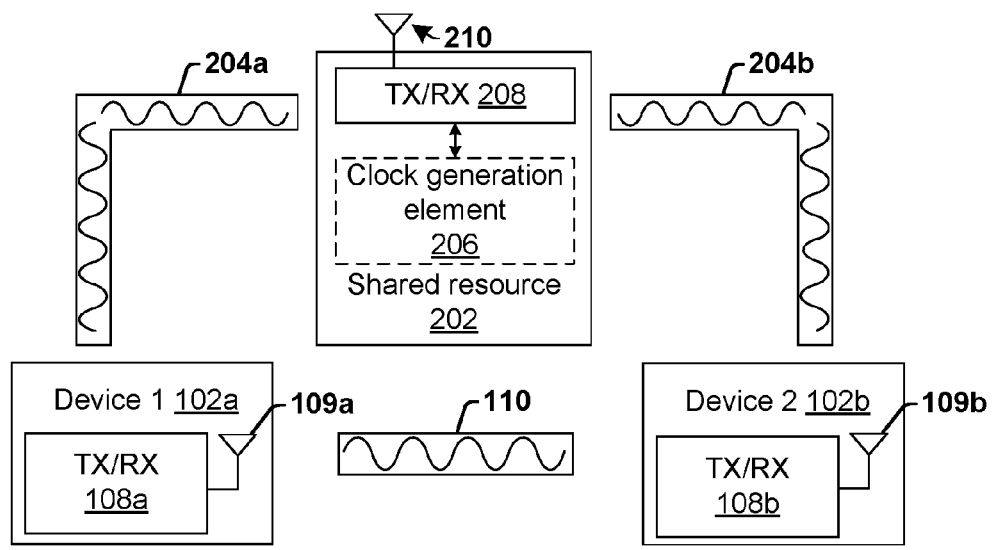
FIG. 2 is a block diagram of some embodiments of a system having a plurality of electronic devices connected to a shared resource by dielectric waveguides.

FIG. 2 is a block diagram of some embodiments of a system 200 having a plurality of electronic devices 102a-102b connected to a shared resource component 202 by way of dielectric waveguides.

The system 200 comprises a first plurality of dielectric waveguides 110 configured to interconnect a plurality of electronic devices 102a-102b. In some embodiments, the first plurality of dielectric waveguides 110 may extend from a position abutting a first electronic device 102a to a position abutting a second electronic device 102b (e.g., from a position within a first integrated chip package to a position within a second integrated chip package). In other embodiments, the first plurality of dielectric waveguides 110 may extend from a position proximate to a first electronic device 102a to a position proximate to a second electronic device 102b.

The system 200 further comprises a second plurality of dielectric waveguides 204a-204b configured to interconnect the plurality of electronic devices 102a-102b to a shared resource component 202. For example, a first dielectric waveguide 204a is disposed at a first location that extends between the shared resource component 202 and a first electronic device 102a, and a second dielectric waveguide 204b is disposed at a second location that extends between the shared resource component 202 and a second electronic device 102b. The shared resource component 202 comprises a shared transceiver element 208 configured to wirelessly transmit and/or receive a shared wireless signal, which are conveyed to the plurality of electronic devices 102a-102b by way of the second plurality of dielectric waveguides 204a-204b.

Connecting the shared resource component 202 to the plurality of electronic devices 102a-102b using the second plurality of dielectric waveguides 204a-204b overcomes a number of problems present with metal interconnect wires. For example, sharing resources between electronic devices using metal interconnect wires causes signal degradation due to cross-talk (e.g., noise), damping, and spreading over distance. The use of the second plurality of dielectric waveguides 204a-204b reduces cross-talk (e.g., noise), thereby allowing for a high quality signal to be provided between the shared resource component 202 and the plurality of electronic devices 102a-102b. Furthermore, the dielectric waveguides 204a-204b provide for a high data transfer rate (e.g., greater than 1 GHz) that allows for resources having a high data value to be shared (e.g., a high speed clock).

In some embodiments, the shared resource component 202 may comprise a shared clock element having a clock generation element 206 configured to generate a common clock signal. The common clock signal is provided to the shared transceiver element 208, which wirelessly transmits the common clock signal as a wireless signal to the first and second electronic devices, 102a and 102b.

In some embodiments, the clock generation element 206 may comprise an oscillator configured to generate a clock signal. The high data transfer rate of the second plurality of dielectric waveguides 204a-204b allows for a clock signal having a high clock rate (e.g., a clock of more than 100 MHz) to be shared with the plurality of electronic devices 102a-102b. By sharing the clock signal between the plurality of electronic devices 102a-102b, a high quality oscillator (e.g., a high quality crystal oscillator) can be used to generate an accurate clock at a relatively low cost. Furthermore, since the same clock signal is provided to the plurality of electronic devices 102a-102b, drift between different clock signals is avoided.

In other embodiments, the clock generation element 206 may use antenna 210 to receive a clock signal by way of a wireless signal. For example, the antenna 210 may be configured to receive a clock signal from a global positioning satellite (GPS). Such a clock signal may comprise a high quality clock signal generated by an atomic clock, for example. In some such embodiments, the clock generation element 206 may comprise a phase locked loop (PLL) configured to reduce the period of the clock signal (i.e., to generate a common clock signal having a higher clock rate).

Although system 200 illustrates an example of a shared resource comprising a clock signal, it will be appreciated that the shared resource element 202 is not limited to providing a shared resource comprising a clock signal to the plurality of electronic devices 102a-102b. Rather, in various embodiments, the shared resource element 202 may be configured to provide a variety of alternative shared resources to the plurality of electronic devices 102a-102b.

Figure 3:
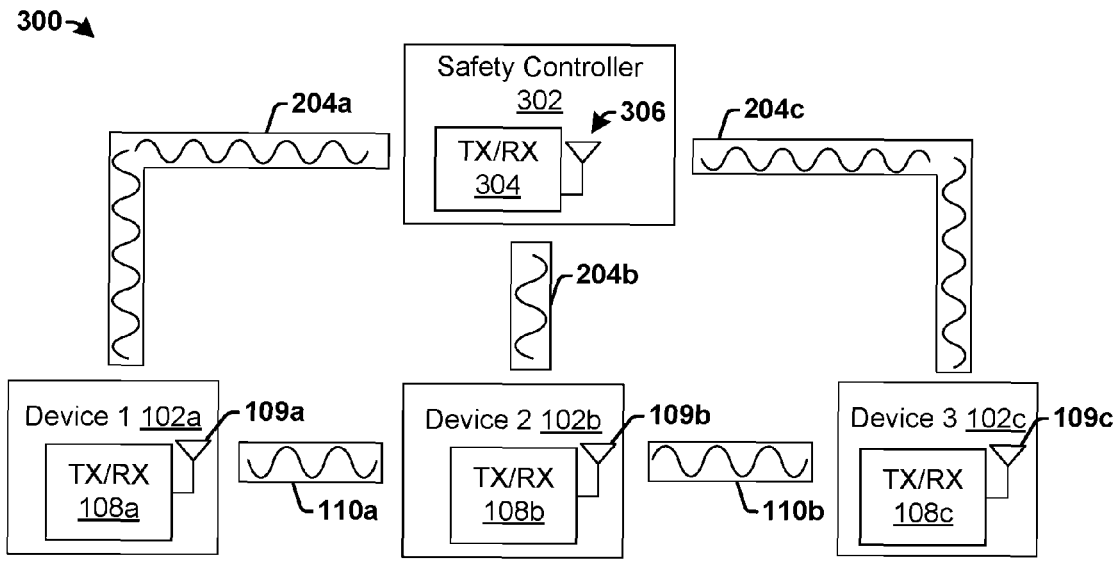
FIG. 3 is a block diagram of some embodiments of a system having a plurality of electronic devices connected to a shared safety controller by dielectric waveguides.

FIG. 3 is a block diagram of some embodiments of a system 300 having a plurality of electronic devices 102a-102c connected to a shared safety controller 302 by a plurality of dielectric waveguides.

System 300 comprises a shared safety controller 302. The shared safety controller 302 is in communication with a plurality of electronic devices 102a-102c by way of a plurality of dielectric waveguides 204a-204c. For example, a first one of the second plurality of dielectric waveguide 204a is disposed at a first location extending between the shared safety controller 302 and a first electronic device 102a, a second dielectric waveguide 204b is disposed at a second location extending between the shared safety controller 302 and a second electronic device 102b, etc. The shared safety controller 302 comprises a transceiver element 304 configured to wirelessly transmit safety data to and/or receive safety data (i.e., data corresponding to a safety condition of system 200) from the plurality of electronic devices 102a-102c.

Based upon the received safety data to selectively generate a response signal that causes an action to be taken to resolve an unsafe condition. For example, the shared safety controller 302 within an automobile may receive the safety data from a first electronic device 102a comprising a radar system indicating that a distance to another automobile is too small. In response to the received safety data, the shared safety controller 302 may provide a signal to a second electronic device 102b comprising an actuator that is configured to engage a breaking system that reduces a speed of the automobile.

In some embodiments, the shared safety controller 302 may be configured to link together safety data received from different ones of the plurality of electronic devices 102a-102c and to make a decision based upon the linked safety data. In some embodiments, the shared safety controller 302 may comprise a safety controller having a high level of complexity that is used to meet the standards of Automotive Safety Integrity Level (ASIL) D.

Figure 4A:
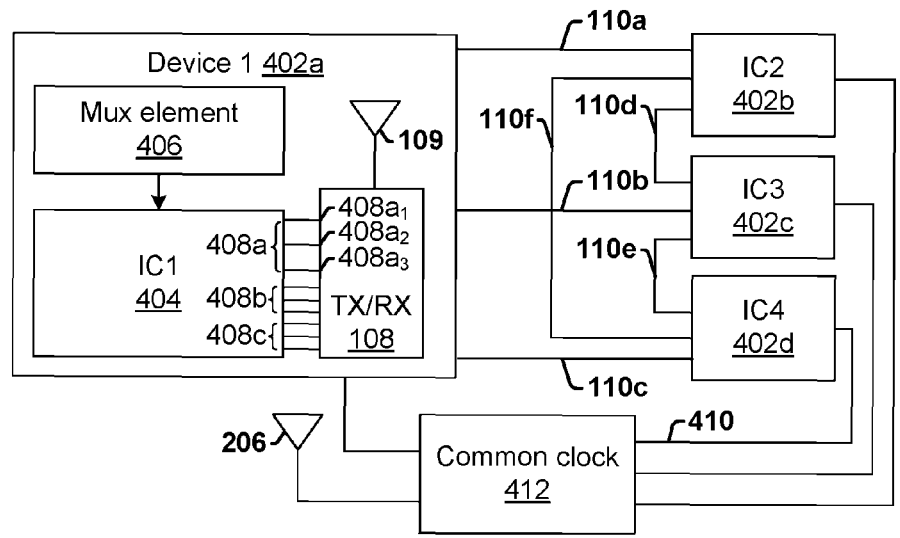
FIG. 4A is a block diagram of some additional embodiments of a system having a plurality of electronic devices interconnected by dielectric waveguides.

FIG. 4A is a block diagram of some additional embodiments of a system 400 having a plurality of electronic devices 102a-102c interconnected by a plurality of dielectric waveguides 110a-110f.

The system 400 comprises a four electronic devices 402a-402d. Each of the electronic devices 402a-402d is connected to the other three electronic devices by way of a separate dielectric waveguide. For example, a first electronic device 402a is connected to a second electronic device 402b by way of a first dielectric waveguide 110a, to a third electronic device 402c by way of a second dielectric waveguide 110b, and to a fourth electronic device 402d by way of a third dielectric waveguide 110c.

The electronic devices 402a-402d respectively comprise a multiplexing element 406 configured to control the flow of data from an integrated chip 404 to a transceiver element 108 configured to transmit a wireless signal to the dielectric waveguides 110a-110f. The multiplexing element 406 is configured to multiplex data from a plurality of output pins 408 of an integrated chip 404 to the transceiver element 108. For example, if the first electronic device 402a has three (3) output pins $408a_1$-$408a_3$ that are configured to provide data to the second electronic device 402b, the multiplexing element 406 is configured to multiplex data from the three output pins $408a_1$-$408a_3$ to transceiver element 108, which transmits a wireless signal comprising the multiplexed data onto dielectric waveguide 110a.

In some embodiments, the multiplexing element 406 is configured to provide the data output from the plurality of output pins 408 to distinct and separate frequency ranges of wireless signal transmitted by transceiver element 108. In other embodiments, the multiplexing element 406 is configured to provide the data output from the plurality of output pins 408 to a wireless signal transmitted by the transceiver element 108 as temporally separated data packets or as data packets having different codes, for example.

In some embodiments, the multiplexing element 406 comprises a pin control unit disposed within the integrated chip 404 (e.g., a dedicated pin control unit disposed within an integrated chip). The pin control unit is configured to control the output of data from the integrated chip 404 to different ones of the plurality of output pins 408. Although, system 400 is illustrated as having three (3) output pins configured to provide data to the second electronic device 402b, it will be appreciated that since the data rate of the plurality of dielectric waveguides 110a-110f is large compared to metal interconnects, the disclosed method and apparatus may be used with any number of output pins. For example, for a system 400 having four (4) output pins configured to provide data to the second electronic device 402b, the multiplexing element 406 would multiplex data from the four output pins onto a same dielectric waveguide.

Figure 4B:
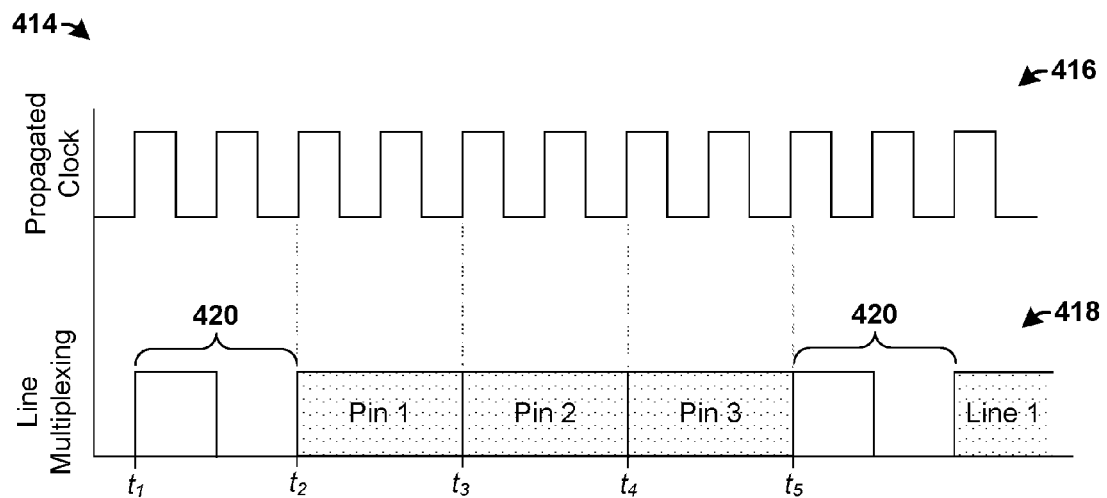
FIG. 4B is a timing diagram showing the transmission of data between two electronic devices on a dielectric waveguide in the system of FIG. 4A.

FIG. 4B is a timing diagram 414 showing a signal 418 transmitted over a dielectric waveguide between two electronic devices on a dielectric waveguide in system 400 as a function of a clock signal 416.

The signal 418 comprises data multiplexed from output pins 408 of an integrated chip 404 in a cyclical manner. In some embodiments, each cycle is separated by an initialization pattern 420 that indicates that the cycle is starting over. In some embodiments, the initialization pattern 420 may comprise a pattern having a logical "1" and a logical "0" (i.e., a "10" pattern). The initialization pattern 420 avoids confusion between data from different pins (e.g., pin $408a_1$ outputs data first after the "10" pattern, pin $408a_2$ outputs data second after the "10" pattern, etc.). In some embodiments, the transition from the logical "1" to the logical "0" in the initialization pattern 420 may be used to estimate the eventual delay between the propagated clock and the line multiplexing (if there is any) and to optimize accordingly the sampling time.

The signal 418 conveys data from an output pin 408 for a duration of two clock cycles, without content change. For example, data from a first output pin $408a_1$ is conveyed for a duration of two clock cycles starting at a time $t_2$, data from a second output pin $408a_2$ is conveyed for a duration of two clock cycles starting at a time $t_3$, and data from a third output pin $408a_3$ is conveyed for a duration of two clock cycles starting at a time $t_4$.

Although timing diagram 414 illustrates multiplexing in time, it will be appreciated that the multiplexing element 406 is not limited to such multiplexing. Rather, the multiplexing element 406 may multiplex in frequency, time, code, or a combination thereof. For example, in other embodiments the large bandwidth of the plurality of dielectric waveguides 110a-110f allow the multiplexing element 406 to multiplex the data output from the plurality of pins $408a_1$-$408a_3$ in frequency (i.e., to transmit data from the plurality of pins $408a_1$-$408a_3$ at different frequency ranges). In some embodiments, the multiplexing element 406 may be configured to perform an orthogonal frequency division multiplexing, which provides data from different pins $408a_1$-$408a_3$ to frequencies that are orthogonal to each other. The orthogonal frequencies don't disturb each other so that high transmission rates can be achieved without interference. In other embodiments, the multiplexing element 406 is configured to provide a dedicated code (e.g., use a dedicated coding scheme) to the output of different pins $408a_1$-$408a_3$.

Figure 5:
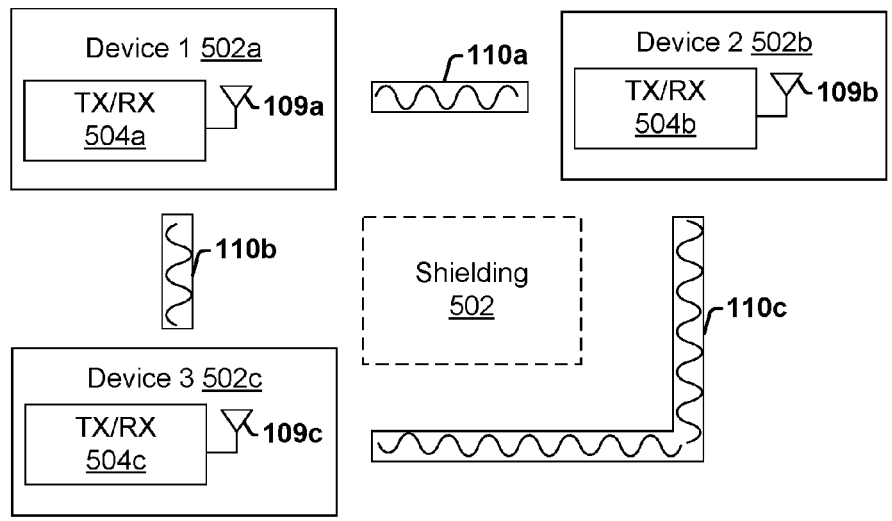
FIG. 5 is a block diagram of some additional embodiments of a system having a plurality of electronic devices configured to communicate over dielectric waveguides.

FIG. 5 is a block diagram of some additional embodiments of a system 500 having a plurality of electronic devices 502a-502c configured to communicate over a plurality of dielectric waveguides 110a-110c.

In some embodiments, system 500 comprises a shielding element 502 configured to further reduce cross talk between dielectric waveguides 110a-110c. In some embodiments, shielding element 502 may be done by distance since the electric field conveyed by the dielectric waveguides 110a-110c extends a small distance outside of the dielectric waveguides 110a-110c. In other embodiments, the outside of the dielectric waveguides 110a-110c may be covered by a metal material (e.g., copper), which reduces penetration of the electric field through the dielectric waveguides 110a-110c. In yet other embodiments, the dielectric waveguides 110a-110c may be surrounded by a dielectric material having a different dielectric constant than the dielectric waveguides 110a-110c.

Figure 6:
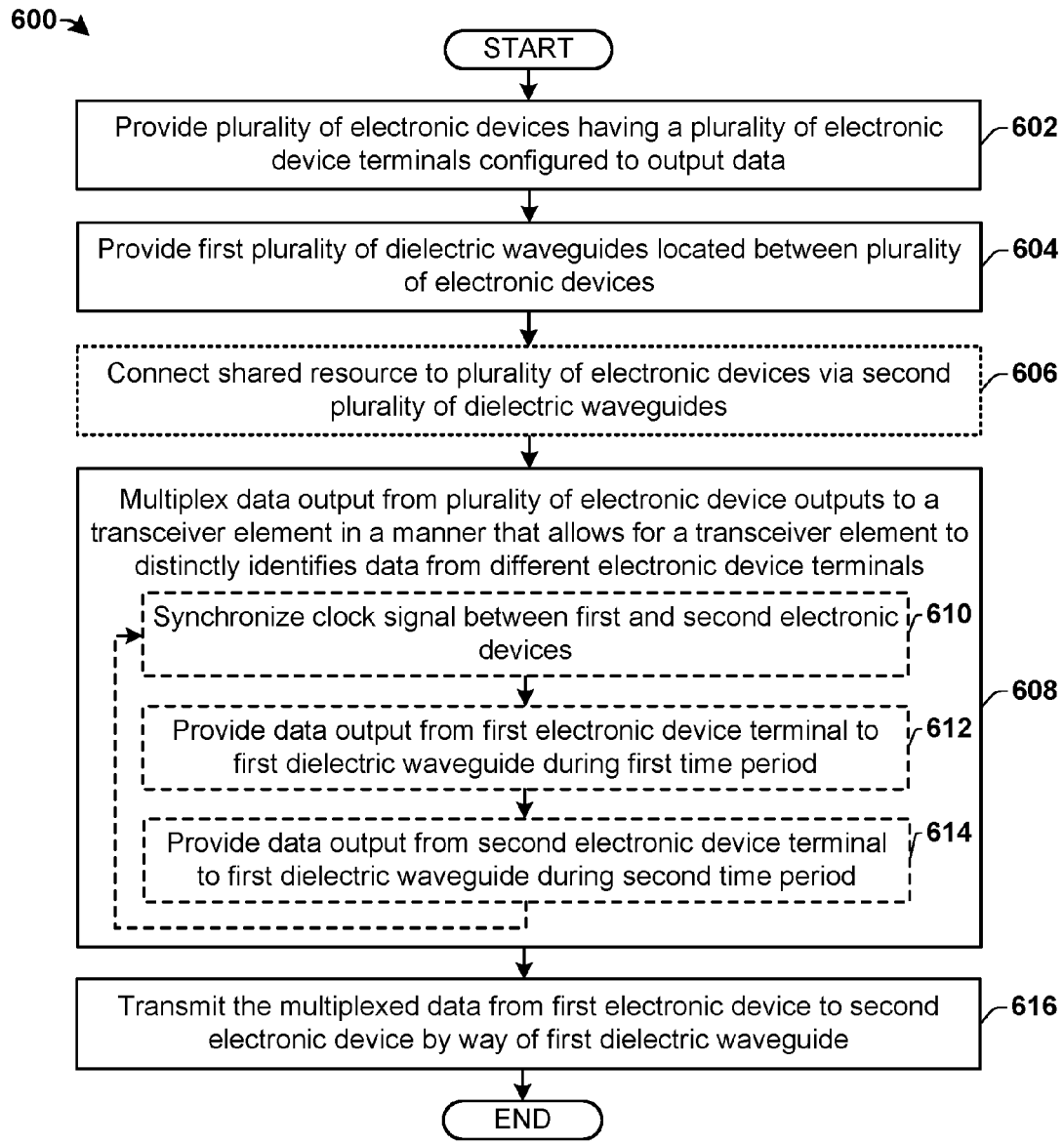
FIG. 6 is a flow diagram of an exemplary method of forming a system having a plurality of electronic devices interconnected by dielectric waveguides.

FIG. 6 is a flow diagram of an exemplary method 600 of forming a system having a plurality of electronic devices interconnected by dielectric waveguides.

It will be appreciated that while method 600 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 602, a plurality of electronic devices are provided, respectively having a plurality of electronic device terminals (i.e., outputs) configured to output data At 604, a plurality of dielectric waveguides are provided to locations disposed between the plurality of electronic devices At 606, a shared resource is connected to the plurality of electronic devices via a second plurality of dielectric waveguides. For example, a first waveguide may be disposed between the common shared resource and a first one of the plurality of integrated chips, a second waveguide may be disposed between the common shared resource and a first one of the plurality of integrated chips, etc.

At 608, data output from plurality of electronic device terminals is multiplexed to a signal that is provided to a transceiver element. The data is multiplexed in a manner that separates data output from different electronic device outputs In some embodiments, the data may be multiplexed in time, as described in acts 610-614. At 610, a clock signal of the first electronic device and the second electronic device is synchronized. At 612, provide a data output from a first electronic device terminal of a first electronic device to a dielectric waveguide during a first time period. At 614, provide a data output from a second electronic device terminal of a second electronic device to the dielectric waveguide during a second time period.

At 616, the multiplexed data is transmitted from a first electronic device to a second electronic device by way of a first dielectric waveguide.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the disclosed system is illustrated as having two offset correction circuits and two feedback loops, one of ordinary skill in the art will appreciate that a disclosed system may comprise more than two offset correction circuits and/or feedback loops.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions.

What is claimed is:

1. A system, comprising:
    a plurality of electronic devices, respectively comprising:
        a data element having a plurality of terminals configured to respectively output and receive data;
        a transceiver configured to transmit or receive the data as a wireless signal that distinctly identifies the data from different ones of the plurality of terminals;
    a shared resource component comprising a shared transceiver configured to generate a shared wireless signal that transmits a shared signal to the plurality of electronic devices by way of a plurality of dielectric waveguides, wherein respective ones of the plurality of dielectric waveguides are disposed between the shared resource component and one of the plurality of electronic devices; and wherein the plurality of dielectric waveguides comprise solid rods of dielectric material.

2. The system of claim 1, wherein the shared signal comprises a clock signal.

3. The system of claim 1,
wherein the shared resource component further comprises a controller; and
wherein the shared transceiver is configured to receive the data from the plurality of electronic devices by way of the plurality of dielectric waveguides, and the controller is configured to selectively generate a response signal based upon the data received by the shared transceiver.

4. The system of claim 1, wherein the plurality of electronic devices, respectively further comprise:
a multiplexing element configured to provide the data that is output from the plurality of terminals to the transceiver as temporally separated data packets.

5. The system of claim 1, wherein the solid rods of dielectric material are arranged onto a printed circuit board.

6. The system of claim 1, wherein the plurality of dielectric waveguides extend from a first position abutting a first one of the plurality of electronic devices to a second position abutting the shared resource component.

7. The system of claim 1, wherein the plurality of dielectric waveguides extend from a first position within a first integrated chip package of a first one of the plurality of electronic devices to a second position within a second integrated chip package of the shared resource component.

8. The system of claim 1, wherein the plurality of dielectric waveguides extend from a first position proximate to a first one of the plurality of electronic devices to a second position proximate to the shared resource component.

9. The system of claim 1, wherein the data element is configured to output the data from different ones of the plurality of terminals at different times.

10. The system of claim 1, wherein the data element is configured to output the data from the plurality of terminals in a cyclical manner over a plurality of cycles.

11. The system of claim 10, wherein each of the plurality of cycles are separated from adjacent ones of the plurality of cycles by a same bit pattern.

12. A system, comprising:
a plurality of electronic devices respectively, comprising:
a data element having a plurality of terminals respectively configured to output data;
a multiplexing element coupled to a transceiver configured to transmit the data as a wireless signal that distinctly identifies data from different electronic device terminals, wherein the multiplexing element is configured to provide the data from a first one of the plurality of terminals to the transceiver during a first time period and to provide the data from a second one of the plurality of terminals to the transceiver during a subsequent second time period; and
a plurality of dielectric waveguides disposed at locations between the plurality of electronic devices and configured to convey the wireless signal between the plurality of electronic devices.

13. The system of claim 12, wherein the multiplexing element is configured to provide the data from the plurality of terminals to the transceiver in a cyclical manner over a plurality of cycles.

14. The system of claim 13, wherein each of the plurality of cycles are separated from adjacent ones of the plurality of cycles by a same bit pattern.

15. A system, comprising:
a plurality of electronic devices, respectively comprising:
a transceiver configured to transmit or receive a wireless signal;
a data element having a plurality of terminals respectively configured to output or receive data; and
a multiplexer configured to provide the data from a first one of the plurality of terminals to the transceiver during a first time period and to provide the data from a second one of the plurality of terminals to the transceiver during a subsequent second time period, wherein the transceiver is configured to transmit the data as the wireless signal;
a first plurality of dielectric waveguides disposed at locations between the plurality of electronic devices and configured to convey the wireless signal between the plurality of electronic devices;
a shared resource component configured to generate a shared resource, wherein the shared resource component comprises a shared transceiver configured to generate a shared wireless signal that transmits the shared resource; and
a second plurality of dielectric waveguides disposed at locations between the shared resource component and the plurality of electronic devices and configured to convey the shared wireless signal between the shared resource component and the plurality of electronic devices.

16. The system of claim 15, wherein the data element is configured to output the data from the plurality of terminals in a cyclical manner over a plurality of cycles.

17. The system of claim 16, wherein each of the plurality of cycles are separated from adjacent ones of the plurality of cycles by a same bit pattern.

18. The system of claim 16, wherein the data element is configured to output the data from respective ones of the plurality of terminals for a duration of greater than one clock cycle.

19. A system, comprising:
a plurality of electronic devices, respectively comprising:
a data element having a plurality of terminals configured to respectively output and receive data;
a transceiver configured to transmit or receive the data as a wireless signal that distinctly identifies the data from different ones of the plurality of terminals;
a shared resource component comprising a shared transceiver configured to generate a shared wireless signal that transmits a shared signal to the plurality of electronic devices by way of a plurality of dielectric waveguides, wherein respective ones of the plurality of dielectric waveguides are disposed between the shared resource component and one of the plurality of electronic devices; and
wherein the plurality of dielectric waveguides respectively extend from a first position proximate to a first one of the plurality of electronic devices to a second position proximate to the shared resource component.

20. The system of claim 19, wherein the plurality of dielectric waveguides comprise dielectric material arranged over a printed circuit board.

21. A system, comprising:
a plurality of electronic devices, respectively comprising:
a data element having a plurality of terminals configured to respectively output and receive data;
a transceiver configured to transmit or receive the data as a wireless signal that distinctly identifies the data from different ones of the plurality of terminals;

a shared resource component comprising a shared transceiver configured to generate a shared wireless signal that transmits a shared signal to the plurality of electronic devices by way of a plurality of dielectric waveguides, wherein respective ones of the plurality of dielectric waveguides are disposed between the shared resource component and one of the plurality of electronic devices; and wherein the data element is configured to output the data from different ones of the plurality of terminals at different times.

22. The system of claim 21, wherein the data element is configured to output the data from the plurality of terminals over a plurality of cycles; and wherein the plurality of cycles are separated from adjacent ones of the plurality of cycles by a same bit pattern.

\* \* \* \* \*